Jan. 21, 1964  E. L. CHILDERS  3,118,172
APPARATUS FOR SORTING MEAT FROM MIXTURES OF DISUNITED
CHICKEN MEAT AND BONES AND THE LIKE
Filed Dec. 14, 1960  3 Sheets-Sheet 1
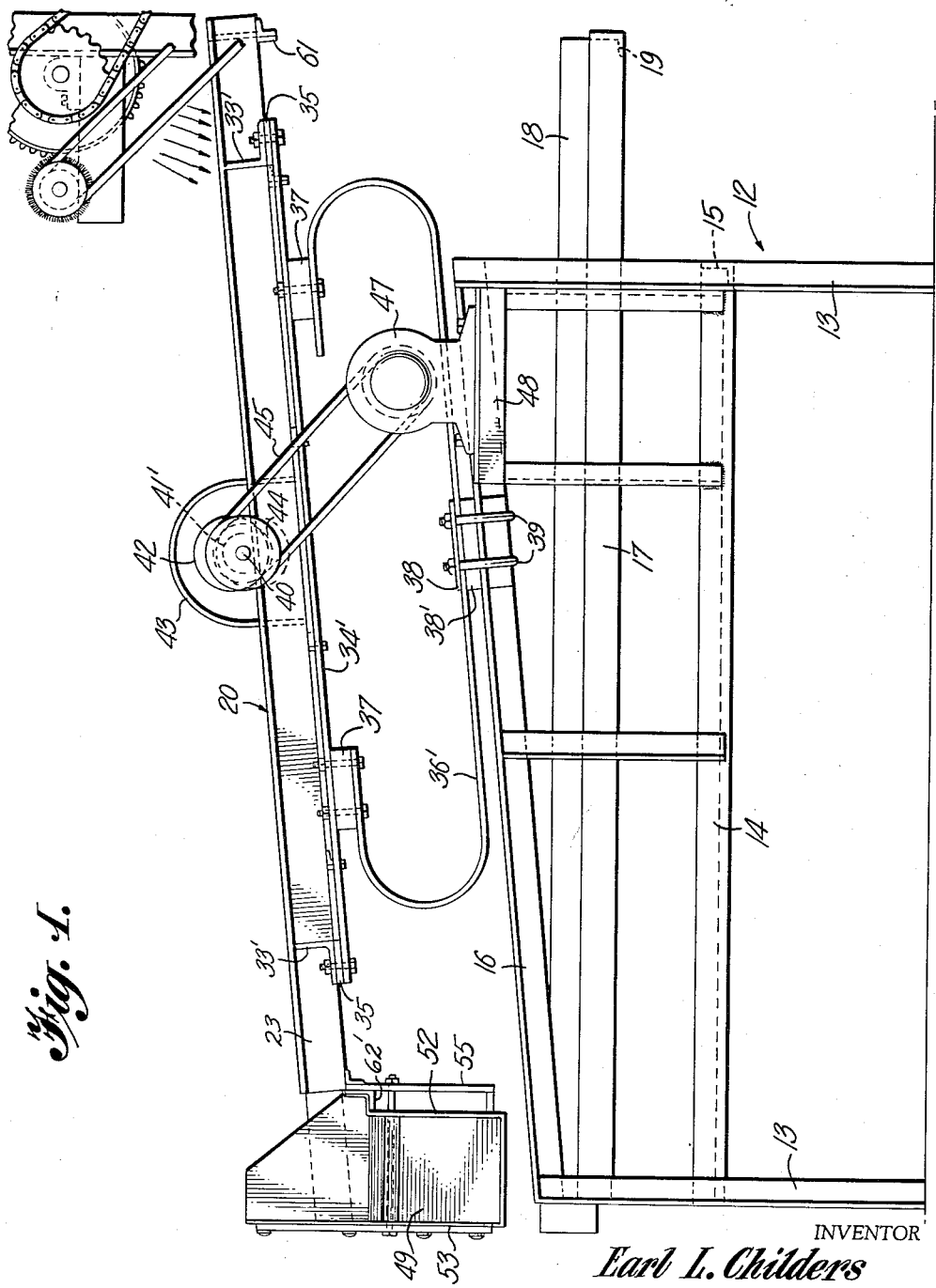
INVENTOR
Earl L. Childers
BY Mason, Fenwick & Lawrence
ATTORNEYS

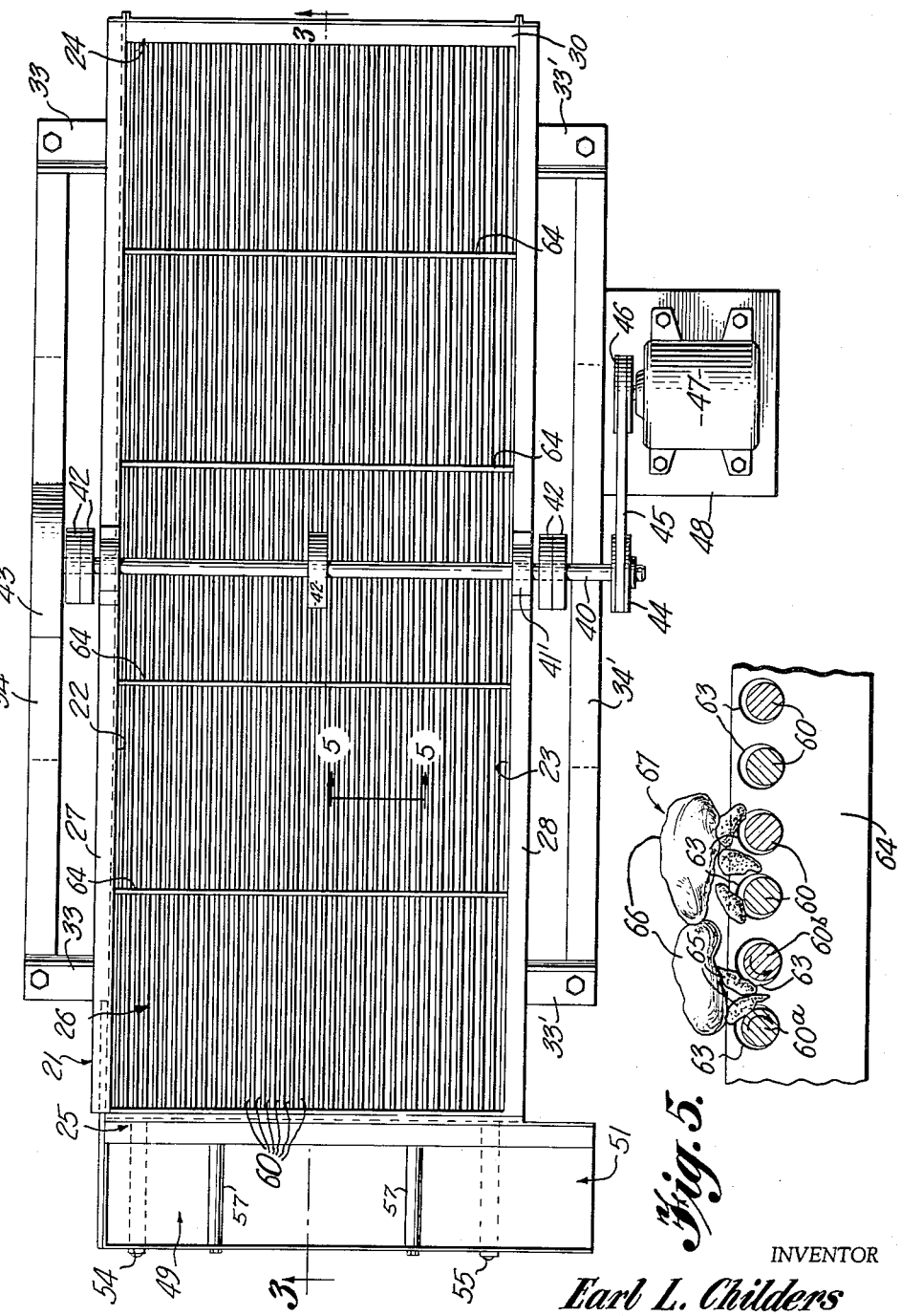

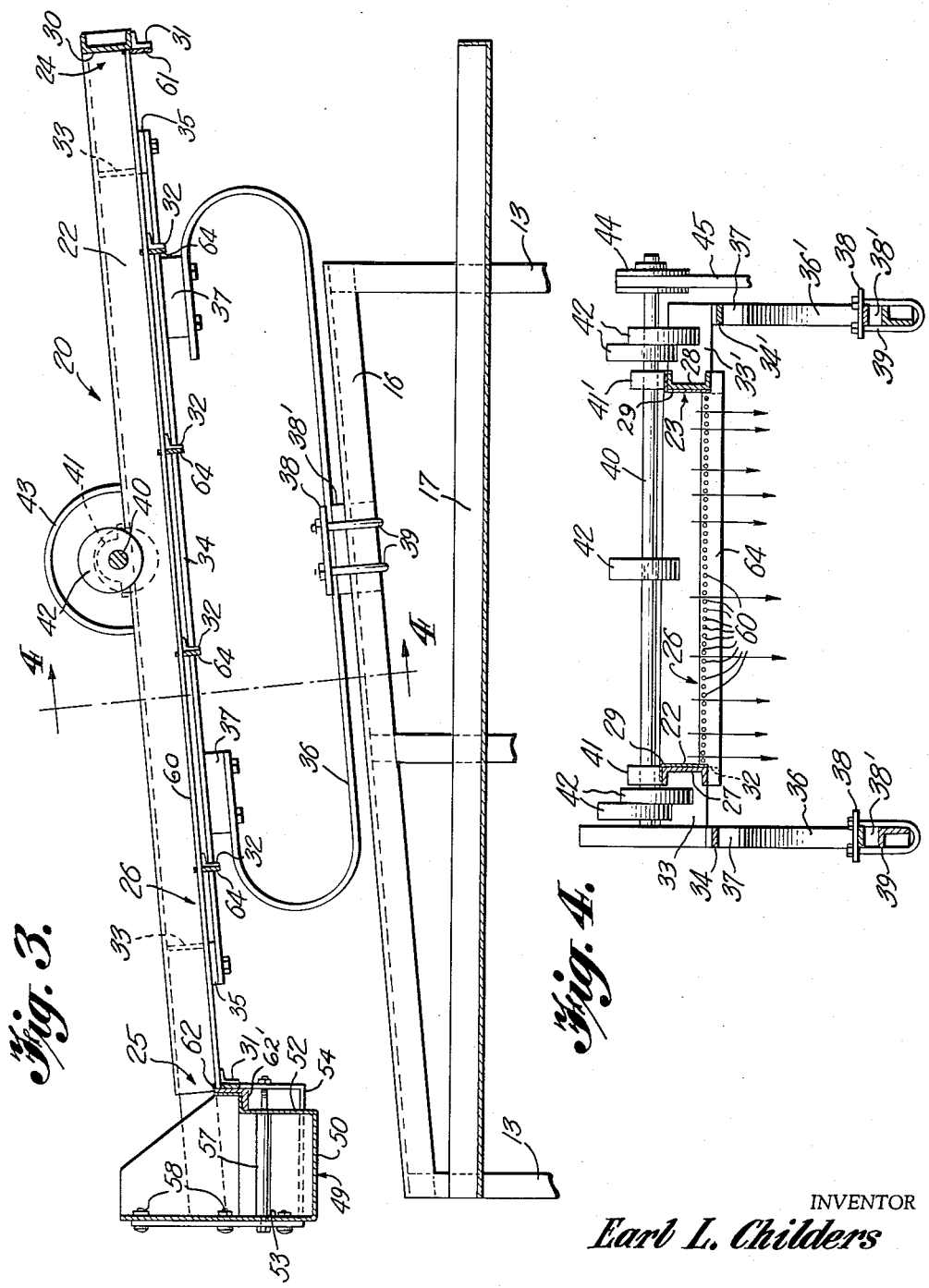

United States Patent Office 3,118,172
Patented Jan. 21, 1964

3,118,172
APPARATUS FOR SORTING MEAT FROM MIXTURES OF DISUNITED CHICKEN MEAT AND BONES AND THE LIKE
Earl L. Childers, P.O. Box 437, Bedford, Va.
Filed Dec. 14, 1960, Ser. No. 75,813
4 Claims. (Cl. 17—1)

The present invention relates in general to vibratory material sorting apparatus and more particularly to apparatus for sorting particles of meat out of a conglomerate mass of disunited meat, bones, cartilage and the like.

It has been recognized for some time that the bony pieces of chicken such as chicken necks, backs and wings constituted a potential source of supply for a substantial quantity of chicken meat of appropriate quality for use in chicken salad, chicken croquettes, chicken pies, spreads and the like if economical means could be found to effect removal of the meat from the bone and sorting of the removed, comminuted or shredded meat particles from a mixture of the disunited meat, bones or cartilage. Manual removal of the meat from such bony chicken pieces would involve such high labor costs that the overall cost of supplying meat from such sources would be prohibitive. Accordingly, for a long time, these pieces of chicken were frequently classified as throw-away items.

However, apparatus has been developed for mechanically removing the meat from the bones of such chicken pieces by passing the pieces of chicken between two closely adjacent, relatively moving rubbing belts, having a large number of closely spaced projections of flexible material to rub or scour the meat off of the bones and discharge from one end thereof a conglomerate mass of disunited meat particles, bone and cartilage. Such a machine is described and shown in my earlier Patent No. 2,932,058 granted April 12, 1960. After so processing the chicken pieces, it becomes necessary to effectively separate or sort the particles of chicken from the meat and bone in the conglomerate mass discharged from the rubbing belt stage and collect the meat in a suitable collecting receptacle. This of course can be done by hand, but such manual sorting requires extraordinary sanitation precautions and involves considerable labor cost in the processing of the chicken pieces.

A vibratory mechanical sorter is also illustrated in and described in my earlier Patent No. 2,932,058 involving a grating tray onto which the conglomerate mass of disunited meat, bone and cartilage is deposited, the meat being sifted through the sized openings in the bottom of the grating tray to effect sorting out of the meat particles in a manner similar to that occurring in the usual grading, sizing and classifying apparatus. However, such a sorting device relying upon a mere mechanical shaking of the conglomerate mass on a grating or screening surface made up of stationary elements does not achieve screening of the meat particles through the grating with the desired speed and effectiveness of separation. This is believed to be due in part to the distortable and slightly flexible character of the shredded or comminuted meat particles and their physical shape.

An object of the present invention, therefore, is the provision of novel vibratory sorting apparatus for receiving conglomerate masses of materials of different sizes and sorting out from the conglomerate mass one type of constituent thereof.

Another object of the present invention is the provision of novel vibratory sorting apparatus for receiving a conglomerate mass of bones and comminuted or shredded meat particles and sorting out of the meat constituent of the mass in a rapid, unique and economical manner under circumstances which will satisfy the rigid requirements of sanitary laws.

Another object of the present invention is the provision of novel vibratory sorting apparatus for receiving a mixture of chicken bones and comminuted or shredded particles of meat removed from said bones by substantially continuous feed meat removing process and effectively sorting the comminuted and shredded meat parts from the mixture at high speed by a grating surface arranged to assist feeding of the meat parts through the grating surface to a collecting receptacle in a novel manner.

Other objects, advantages and capabilities of the present invention will become apparent from the following detailed description, taken in conjunction with the accompanying drawings illustrating one preferred embodiment of the invention.

In the drawings:

FIGURE 1 is a side elevation of vibratory sorting apparatus constructed in accordance with the present invention, and illustrating the discharge end portion of a machine for removing or disuniting meat from the bones of pieces of chicken which feeds a mass of disunited meat and bone to the sorting apparatus;

FIGURE 2 is a top plan view of the vibratory sorting apparatus;

FIGURE 3 is a longitudinal vertical section view thereof, taken along the line 3—3 of FIGURE 2;

FIGURE 4 is a fragmentary vertical transverse section view of the vibratory grating tray and adjacent components of the machine, taken along the line 4—4 of FIGURE 3; and FIGURE 5 is an enlarged vertical transverse section view taken through a plurality of the rods forming the grating surface of the vibratory grating tray substantially along the lines 5—5 of FIGURE 2 and illustrating the manner of operation of the device to enhance the feeding of the meat pieces through the grating surface.

Referring to the drawings, wherein like reference characters designate corresponding parts throughout the several figures, the vibratory sorting apparatus embodying the present invention is indicated generally by the reference character 10 and is adapted to be disposed adjacent the discharge or exit end of a machine indicated generally by the reference character 11 having a work zone through which pieces of chicken or the like are fed by a substantially continuous feed process. Means are provided in this work zone to so treat the chicken pieces as to effect substantially complete removal or disuniting of the meat from the bone of such chicken pieces. Specifically, the vibratory sorting apparatus is designed for use with a machine for removing or disuniting the meat from the bones of chicken pieces of the type illustrated in my earlier Patent No. 2,932,058, granted April 12, 1960, wherein the chicken pieces are fed between generally parallel regions of a pair of scouring or rubbing belt portions formed of resiliently deformable material such as neoprene or the like and having a large number of projections of generally conical configuration. The belts are arranged for relative movement between the adjacent belt portions, as by rendering one movable and the other stationary or rendering them both movable at different speeds, the resilient portions on the belts working the chicken pieces to remove the meat therefrom in generally shredded or comminuted condition.

The vibratory sorting apparatus comprises a stationary supporting frame 12 formed of a plurality of upright legs or members 13, longitudinal frame members 14 and transverse frame members 15, the upright legs 13 at each side having secured to the top thereof angle iron members 16 which extend along a plane parallel to a transverse horizontal axis and declining downwardly away from the machine 11. The upright legs 13 also support a pair of longitudinal guide rails or runners 17 which support a meat-catching pan 18 preferably formed of stainless steel and of generally rectangular configuration. A suitable stop member or angle iron 19 extends transversely between the ends of the guide rails 17 at the right-hand end of the apparatus as viewed in FIGURE 1 to limit sliding movement of the meat-catching pan 18 to the right and assist in properly locating the pan 18.

Surmounted on the stationary supporting frame 12 is the vibratory assembly 20 which includes a sorting tray structure 21 having sides 22 and 23, feed and discharge ends 24 and 25, respectively and a grating surface 26 forming the bottom of the sorting tray 21. The sides 22, 23 of the sorting tray 21 are formed of a pair of parallel channel side iron frame members 27, 28 whose flanges are directed outwardly, the surfaces of the channel iron members 27, 28, which may be exposed to possible contact with the meat being covered with stainless steel sheeting 29. A stainless steel angle member 30 extends transversely between the side channel iron members 27, 28 at the feed end of the sorting tray 21 and is secured at its opposite ends to the side framing members 27, 28. Bottom stainless steel transverse angle members 31 at the opposite longitudinal ends of the tray and similar intermediate stainless steel transverse angle members 32 are supported on the channel iron members 27 and 28 at longitudinally spaced points along the tray 21 and are secured as by bolting to the lower flanges of the channel iron members 27, 28 in depending relation thereto. A pair of laterally projecting angle iron extensions 33, 33′ are secured to the channel iron members 27, 28 at longitudinally spaced points near the opposite ends of the channel iron members 27, 28 and are secured at their outer ends by bolts or similar securing means to the opposite ends of the straight spring straps 34, 34′, suitable spacer blocks 35 being interposed between the bottom flanges of the extensions 33, 33′ and the spring straps 34, 34′. The straight spring straps 34, 34′ are in turn secured by bolts to the free end portions of generally C-shaped bent springs 36, 36′ at points intermediate the connections of the straight springs with the angle iron extensions 33, 33′, spacer blocks 37 being interposed between the straight spring straps 34, 34′ and the bent springs 36, 36′. The C-shaped bent springs 36, 36′ are oriented in an upwardly opening relation as illustrated in FIGURE 1 and are mounted on the inclined angle iron members 16 of the stationary supporting frame 12 at substantially their centers by suitable means, such as spacer blocks 38, 38′ and U-bolts 39.

A transverse shaft 40 is journaled in bearing blocks 41, 41′ projecting upwardly from the side channel members 27, 28 and affixed to the upper flanges thereof. A plurality of eccentric blocks or counter-weights indicated generally at 42 are fixed to the shaft 40, preferably at locations spaced outwardly of the side channel members 27, 28 and are held against rotation relative to the shaft, as by set screws or the like, to rotate with the shaft and impart vibration thereto at a selected vibratory frequency. A suitable sheet metal shield or guard 43, may be supported on the straight spring strap 34 substantially midway along its length to afford protection against the operator's accidentally contacting the eccentric blocks and receiving injury therefrom. A pulley 44 is keyed to one end of the shaft 40 to be driven by a belt 45 trained around the pulley 44 and around the output shaft pulley 46 of an electric motor 47 supported on a suitable platform 48 fixed to the stationary supporting frame 12.

At the lower or discharge end 25 of the sorting tray 21 a transversely arranged bone and cartilage discharge chute 49 is provided, the chute having a bottom 50 inclined downwardly and laterally of the stationary supporting frame 12 to a discharge opening 51 at one side thereof and having side walls 52 and 53 adjacent and spaced from the discharge end of the tray respectively. The bottom and side walls of the discharge chute 49 are all preferably formed of stainless steel sheet material. The discharge chute 49 is rigidly carried by the main frame of the sorting tray 21 by means of a pair of transversely spaced, generally U-shaped strap metal brackets 54, 55 fixed at their ends adjacent the discharge end of the sorting tray 21 to the transverse angle iron 31 secured to the side channel members 27, 28 and held in position by through bolt and spacer assemblies 57 and bolts 58 connected with the brackets 54, 55.

The grating surface 26 of the sorting tray 21 is formed of a plurality of longitudinally extending, parallel rods 60 supported at their opposite ends in rod-supporting plates 61 and 62 secured at their ends to the depending flanges of the transverse stainless steel angle members 31 and backed up by channel member 30 and angle iron 62′. The rods 60 also extend through like supporting plates 64 on the intermediate angle members 32. In one preferred embodiment, the rods 60 are $3/16$ inch stainless steel rods spaced on $7/16$ inch centers. The grating rods 60 are especially supported to be free to rotate in either direction about their centers in response to unbalance of forces thereon and as a result of reaction of the rods to the vibratory forces generated by rotation of the eccentric blocks 42 and the resilient mounting of the sorting tray 21 on the stationary supporting frame 12. To achieve this, the sockets 63 in the rod-supporting plates 61 and 62 and the plates 64 secured to the depending flanges of the intermediate angle members 32 are formed of a slightly greater diameter than the diameter of rods 60. In one preferred embodiment, the sockets 63 are drilled to $7/32$ inch diameter to provide a $1/32$ inch greater socket diameter than the outer diameter of the rod 60.

It will be appreciated that upon rotation of the shaft 40 at high speed, the vibration imparted to the sorting tray 21 will create an unbalance of forces on the grating rods 60 producing a resultant torque for each rod 60 and causing the same to rotate. Because the rods 60 are freely supported for rotation in the sockets 63 and are free to rotate in either direction at any rate of speed in response to force moments thereon tending to produce rotation, an adjacent pair of rods on which comminuted or shredded pieces of meat, as indicated at 65, and pieces of bone 66 forming ingredients of the conglomerate mass 67 delivered to the grating surface 26, will produce unbalanced forces on the adjacent rods 60a and 60b when they occupy the positions illustrated in FIGURE 5, causing these rods to rotate toward the intervening space, that is, causing the rod 60a to rotate in a clockwise direction and the rod 60b in a counter-clockwise direction as viewed in FIGURE 5. The effect of this rotation of the rods 60a and 60b toward each other will be to tend to feed the pieces of meat 65 which are sufficiently small to pass through the space between the grating rods downwardly between the rods 60a and 60b, not only through gravitational forces but through surface engagement of the rods 60a, 60b with the meat and movement of those surfaces due to rotation of the rods in a direction tending to feed the meat downwardly between the rods. While the lighter meat pieces will tend to occupy the upper level as the result of the differences of inertia of the two constituents of the mass 67, the rotation of the rods 60 enhances this stratifying of the materials as the rods will exert downward forces on the pieces of meat projecting between pairs of rods rotating toward each other further holding these meat pieces down in the lower stratum. The rotation of the grating rods 60 also tends to tumble the larger bone pieces in addition to the tossing of the bone arising from the vibration of the tray, and facilitates the translation of the bone and cartilage longitudinally to the discharge chute 49. The comminuted and shredded meat pieces which pass through the spaces between the grating rod 60 fall into the meat-catching pan 18 or other suitable collecting receptacle, which may be removed from the machine at suitable intervals when a sufficient quantity of meat has accumulated therein, and the bone and cartilage which is transferred to the discharge chute 49 through the discharge end 25 of the sorting tray 21 is moved laterally by the vibratory movement of the discharge chute to pass out of the discharge opening 51 and into a suitable collecting vessel.

By means of this apparatus, an extremely effective and high-speed sorting of the comminuted and shredded meat particles from the mass of meat particles, bone and cartilage deposited on the grating surface 26 is achieved as a result of the combined action of the vibrating action imparted to the sorting tray 21 and the supporting of the grating rods 60 so that they are free to rotate about their longitudinal axes in response to whatever forces may throw the rods out of a state of equilibrium. This apparatus has been found to effectively achieve the sorting out of substantially all of the meat particles in the conglomerate mass deposited thereon with such efficiency and speed that it avoids the necessity of rerunning batches of sorted meat through any further sorting operation to achieve satisfactory separation and performs the sorting procedure at a sufficiently fast rate to keep up with the operation of the machine supplying the comminuted mass thereto.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for separating shredded meat constituents from a conglomerate mass of disunited meat and bone derived from working cooked chicken pieces between generally parallel adjacent elongated portions of resilient rubbing belts having raised flexible pointed projections thereon or the like, comprising an elongated upwardly opening tray having longitudinally spaced feed and discharge ends and a grating forming the bottom thereof on which the conglomerate mass is to be deposited adjacent the feed end, said grating comprising a plurality of longitudinally extending, substantially parallel rods spaced apart transversely to provide sized openings for passage of the meat constituents therethrough while precluding passage of the bone in said mass, means for supporting said tray disposing said grating along an inclined plane declining longitudinally toward said discharge end at a small angle to a horizontal plane including a stationary supporting frame and spring members resiliently supporting said tray from said frame for reciprocative translatory movement relative to the frame in a direction extending substantially normal to said inclined plane, driven means for rapidly vibrating said tray to reciprocate the tray and grating relative to the frame in said direction with sufficient force and movement to toss at least the bone constituents of said mass relative to said grating, and means supporting said rods for movement in a manner tending to restrain the meat constituents at a lower stratum than the bone constituents and to assist passage of the meat constituents downwardly through the sized openings including rod support members having substantially circular sockets in which the ends of said rods are nested and having a slightly greater diameter than the rods to accommodate a small range of diametric movement of the rods in any radial direction relative to the sockets and permit rotation of the rods about their axes responsive to turning moments thereon.

2. Apparatus for separating shredded meat constituents from a conglomerate mass of disunited meat and bone derived from working cooked chicken pieces between generally parallel adjacent elongated portions of resilient rubbing belts having raised flexible pointed projections thereon or the like, comprising an elongated upwardly opening tray having longitudinally spaced feed and discharge ends and a grating forming the bottom thereof on which the conglomerate mass is to be deposited adjacent the feed end, said grating comprising a plurality of longitudinally extending, substantially parallel rods spaced apart transversely to provide sized openings for passage of the meat constituents therethrough while precluding passage of the bone in said mass, means for supporting said tray disposing said grating along an inclined plane declining longitudinally toward said discharge end at a small angle to a horizontal plane including a stationary supporting frame and spring member resiliently supporting said tray from said frame for reciprocative translatory movement relative to the frame in a direction extending substantially normal to said inclined plane, motor driven means for rapidly vibrating said tray to reciprocate the tray and grating relative to the frame in said direction with sufficient force and movement to toss at least the bone constituents of said mass relative to said grating, and means supporting said rods for movement in a manner tending to restrain the meat constituents at a lower stratum than the bone constituents and to assist passage of the meat constituents downwardly through the sized openings including rod support members having substantially circular sockets in which the ends of said rods are nested and having a slightly greater diameter than the rods to accommodate a small range of diametric movement of the rods in any radial direction relative to the sockets and permit rotation of the rods about their axes responsive to turning moments thereon, the difference between the diameters of the sockets and said rods being equal to a small fraction of the diameter of said rods.

3. Apparatus for separating shreaded meat constituents from a conglomerate mass of disunited meat and bone derived from working cooked chicken pieces between generally parallel adjacent elongated portions of resilient rubbing belts having raised flexible pointed projections thereon or the like, comprising an elongated upwardly opening tray having longitudinally spaced feed and discharge ends and a grating forming the bottom thereof on which the conglomerate mass is to be deposited adjacent the feed end, said grating comprising a plurality of longitudinally extending, substantially parallel rods spaced apart transversely to provide sized openings for passage of the meat constituents therethrough while precluding passage of the bone in said mass, means for supporting said tray disposing said grating along an inclined plane declining longitudinally toward said discharge end at a small angle to a horizontal plane including a stationary supporting frame and spring members resiliently supporting said tray from said frame for reciprocative translatory movement relative to the frame in a direction extending substantially normal to said inclined plane, motor driven means for rapidly vibrating said tray to reciprocate the tray and grating relative to the frame in said direction with sufficient force and movement to toss at least the bone constituents of said mass relative to said grating, and means supporting said rods for movement in a manner tending to restrain the meat constituents at a lower stratum than the bone constituents and to assist passage of the meat constituents downwardly through the sized openings including rod support members having substantially circular sockets in which the ends of said rods are nested and having a slightly greater diameter than the rods to accommodate a small range of diametric movement of the rods in any radial direction relative to the sockets and permit rotation of the rods about their axes responsive to turning moments thereon, the difference between the diameters of the sockets and said rods being equal to a small fraction of the diameter of said rods, receptacle means below said grating substantially coextensive with the area of said grating for collecting meat passing therethrough, and chute means adjacent the discharge end of said tray positioned to receive from said grating bones and such constituents of said conglomerate mass as are precluded from passage through said sized openings.

4. Apparatus for separating shreaded meat constituents from a conglomorate mass of disunited meat and bone derived from working cooked chicken pieces between generally parallel adjacent elongated portions of resilient rubbing belts having raised flexible pointed projections thereon or the like, comprising an elongated upwardly opening tray of generally rectangular configuration having rigid transversely spaced side walls and longitudinally spaced feed and discharge ends and a grating forming the bottom thereof on which the conglomerate mass is to be deposited adjacent the feed end, said grating comprising a plurality of longitudinally extending, substantially parallel rods arranged in a common plane and spaced apart transversely to provide sized openings for passage of the meat constituents therethrough while precluding passage of the bone in said mass, a stationary supporting frame for said tray having side rail members spaced at a level below said side walls, a pair of straight spring straps disposed in flanking relation to the side walls of said tray having opposite ends rigidly secured thereto, a pair of spring straps of substantially C-shaped upwardly opening configuration secured near their centers to said side rail members and at their ends to said straight spring straps intermediate the ends thereof, said spring straps resiliently supporting said tray from said frame with said grating disposed along an inclined plane declining longitudinally toward said discharge end at a small angle to a horizontal plane and accommodating reciprocative translatory movement of the tray and grating relative to the frame in a direction extending substantially normal to said inclined plane, means for rapidly vibrating said tray to reciprocate the tray and grating relative to the frame in said direction with sufficient force and movement to toss at least the bone constituents of said mass relative to said grating, and means supporting said rods for movement in a manner tending to restrain the meat constituents at a lower stratum than the bone constituents and to assit passage of the meat constituents downwardly through the sized openings including transverse rod support members extending between said side walls and located at least adjacent said feed and discharge ends having substantially circular sockets in which said rods are nested, said sockets having a diameter exceeding the diameter of the rods by a small fraction of the rod diameter to accommodate diametric movement of the rods in any radial direction relative to the sockets and permit rotation of the rods about their axes responsive to turning moments thereon.

References Cited in the file of this patent

UNITED STATES PATENTS

| | | |
|---|---|---|
| 781,493 | Clements et al. | Jan. 31, 1905 |
| 2,116,225 | Strube | May 3, 1938 |
| 2,932,058 | Childers | Apr. 12, 1960 |

FOREIGN PATENTS

| | | |
|---|---|---|
| 597,598 | France | Nov. 24, 1925 |
| 852,307 | Great Britain | Oct. 26, 1960 |